United States Patent [19]
Krasner

[11] Patent Number: 6,133,873
[45] Date of Patent: *Oct. 17, 2000

[54] METHOD AND APPARATUS FOR ADAPTIVELY PROCESSING GPS SIGNALS IN A GPS RECEIVER

[76] Inventor: Norman F. Krasner, 117 Coventry Ct., San Carlos, Calif. 94070

[*] Notice: This patent is subject to a terminal disclaimer.

[21] Appl. No.: 09/089,924

[22] Filed: Jun. 3, 1998

[51] Int. Cl.[7] .............................. G01S 5/02; H04B 7/185
[52] U.S. Cl. ......................................................... 342/357.12
[58] Field of Search ........................................ 342/357.12

[56] References Cited

U.S. PATENT DOCUMENTS

| | | | |
|---|---|---|---|
| 4,445,118 | 4/1984 | Taylor et al. | 343/357 |
| 4,601,005 | 7/1986 | Kilvington | 364/602 |
| 4,701,934 | 10/1987 | Jasper | 375/1 |
| 4,785,463 | 11/1988 | Jane et al. | 375/1 |
| 4,797,677 | 1/1989 | MacDoran et al. | 342/352 |
| 4,959,656 | 9/1990 | Kumar | 342/418 |
| 4,998,111 | 3/1991 | Ma et al. | 342/352 |
| 5,043,736 | 8/1991 | Darnell et al. | 342/357 |
| 5,202,829 | 4/1993 | Geier | 364/449 |
| 5,223,844 | 6/1993 | Mansell et al. | 342/357 |
| 5,225,842 | 7/1993 | Brown et al. | 342/357 |
| 5,271,034 | 12/1993 | Abaunza | 375/1 |
| 5,311,194 | 5/1994 | Brown | 342/357 |
| 5,317,323 | 5/1994 | Kennedy et al. | 342/457 |
| 5,323,163 | 6/1994 | Maki | 342/357 |
| 5,365,450 | 11/1994 | Schuchman et al. | 455/456 |
| 5,379,047 | 1/1995 | Yokev et al. | 342/457 |
| 5,379,224 | 1/1995 | Brown et al. | 364/449 |
| 5,379,320 | 1/1995 | Fernandes et al. | 375/1 |
| 5,416,797 | 5/1995 | Gilhousen et al. | 375/7.5 |
| 5,420,592 | 5/1995 | Johnson | 342/357 |
| 5,430,759 | 7/1995 | Yokev et al. | 375/202 |
| 5,483,549 | 1/1996 | Weinberg et al. | 375/200 |
| 5,663,734 | 9/1997 | Krasner | 342/357.12 |

FOREIGN PATENT DOCUMENTS 2273218  6/1994  United Kingdom .
WO9428434  12/1994  WIPO .

OTHER PUBLICATIONS

Davenport, Robert G. "FFT Processing of Direct Sequence Spreading Codes . . . " *IEEE 1991 National Aerospace and Electronics Conference NAECON 1991*, vol. 1 pp. 98–105, May (1991).
Pct International Search Report sent on Mar. 10, 1997.
Pct International Search Report sent on Feb. 21, 1997.
"RTCM Recommended Standards for Differential Navstar GPS Service, Version 2.0"Radio Technical Commission for Maritime Services, Jan. 1, 1990.
"Animal–borne GPS: Tracking for Habitat", Rogers & Anson, GPS World, pp. 21, 22, Jul., 1994.
"Navstar GPS User Equipment, Introduction", NATO, Feb. 1991.
"Navigation Journal of the Institute of Navigation, vol. 25, No. 2" The Institute of Navigation, 1978 (entire edition).
"GPS Receiver Structures", Petterson et al., ION–GPS–95, Session C4, Land Vehicular Applications, Palm Springs, CA Sep. 1995.
"An Application of the Global Positioning System to Search and Rescue and Remote Tracking", Raab, et al. Navigation Journal of Instituteof Navigation, vol. 24, No. 3, 1977.

*Primary Examiner*—Thomas H. Tarcza
*Assistant Examiner*—Fred H. Mull
*Attorney, Agent, or Firm*—Blakely, Sokoloff, Taylor & Zafman

[57] ABSTRACT

A method and apparatus is disclosed for adaptively processing Global Positioning System (GPS) signals in a GPS receiver. An adaptive method of processing GPS signals optimizes the initial acquisition of GPS signals by performing the search using three separate parameters. These parameters include satellite number, Doppler information, and integration time. A block processing method of GPS signal processing is performed for particular in-view satellites over particular time intervals and for each of a set of hypothesized Doppler frequencies. Each parameter is optimized such that the GPS signal acquisition operation for a location fix is performed in a short period of time.

44 Claims, 6 Drawing Sheets

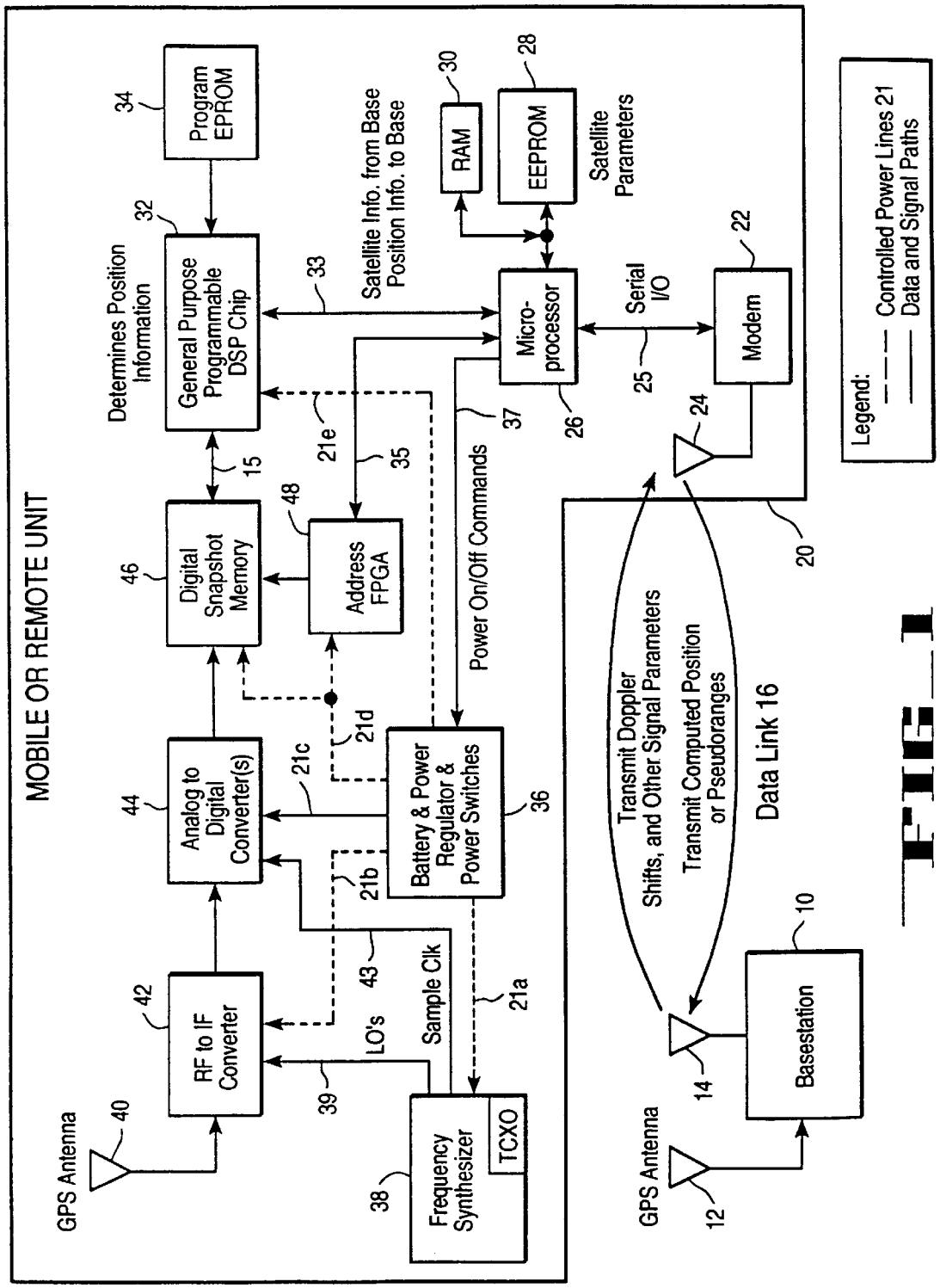
FIG_1

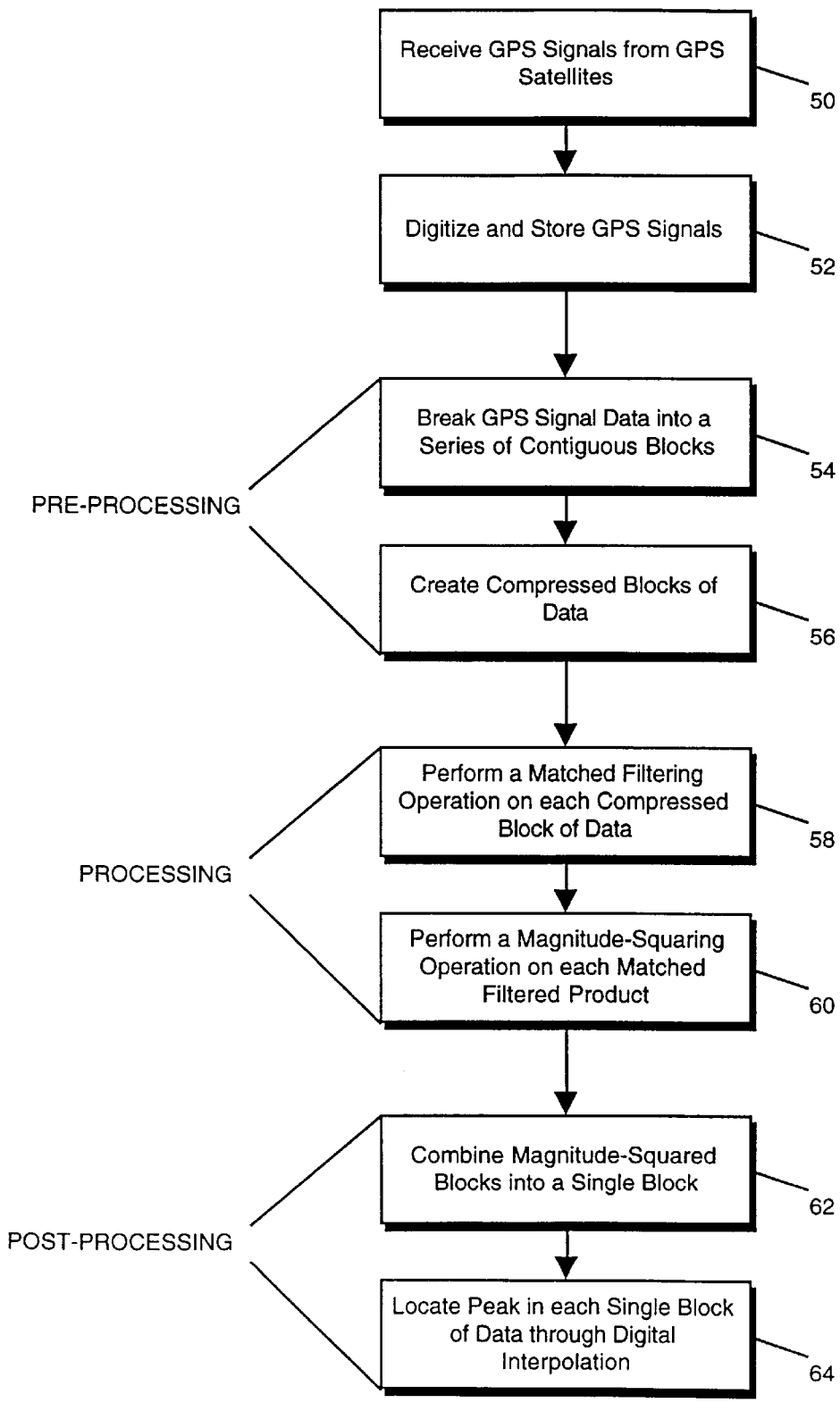
FIG_2

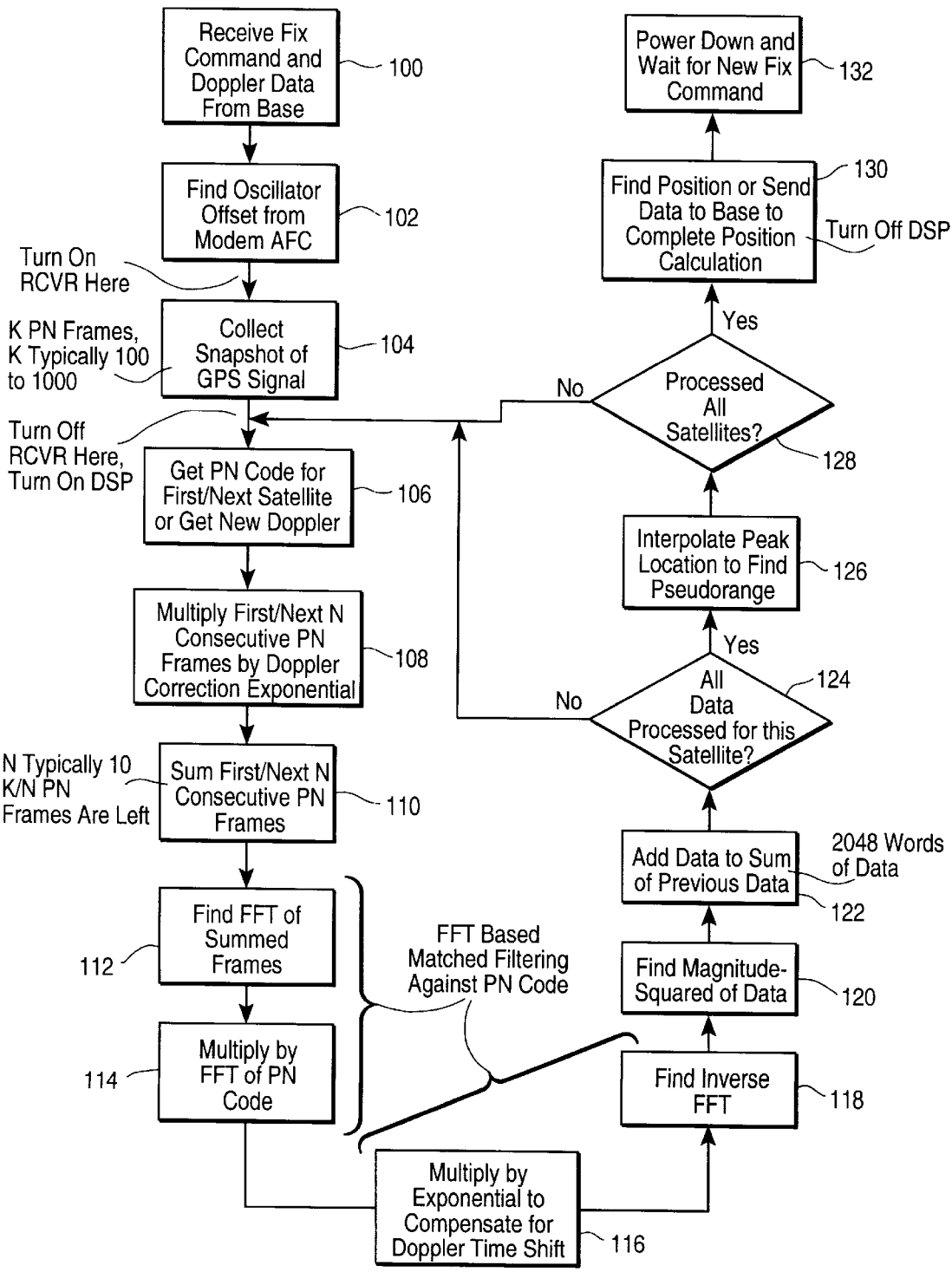
FIG_3

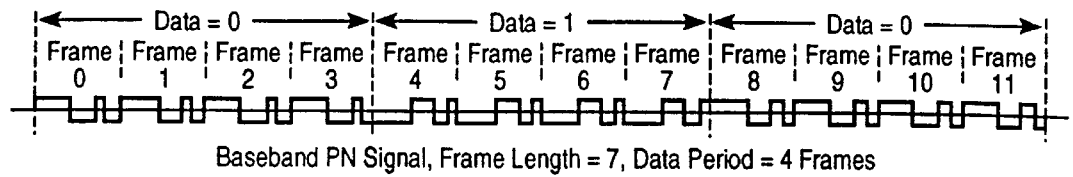
Baseband PN Signal, Frame Length = 7, Data Period = 4 Frames
FIG_4A
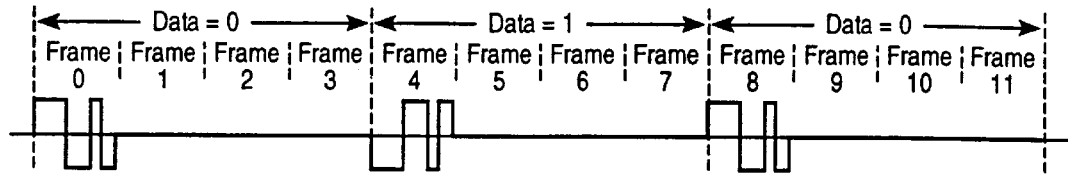
Output After Summing Groups of 4 PN Frames
FIG_4B
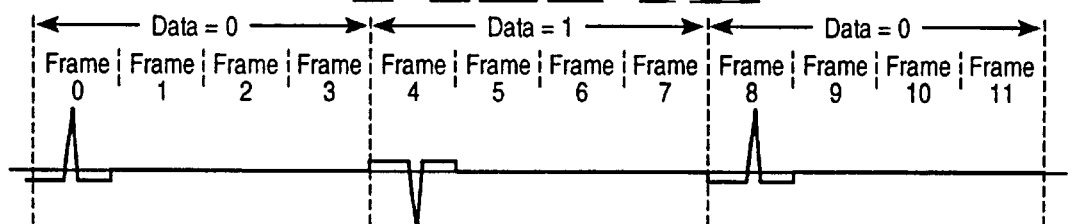
Output After FFT Based Matched Filter
FIG_4C
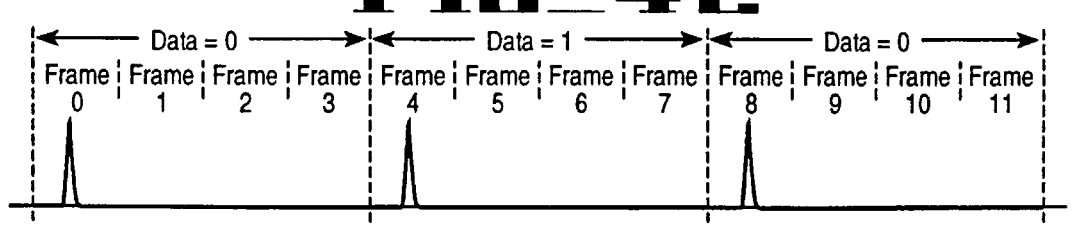
Output After Squaring Matched Filter Outputs
FIG_4D
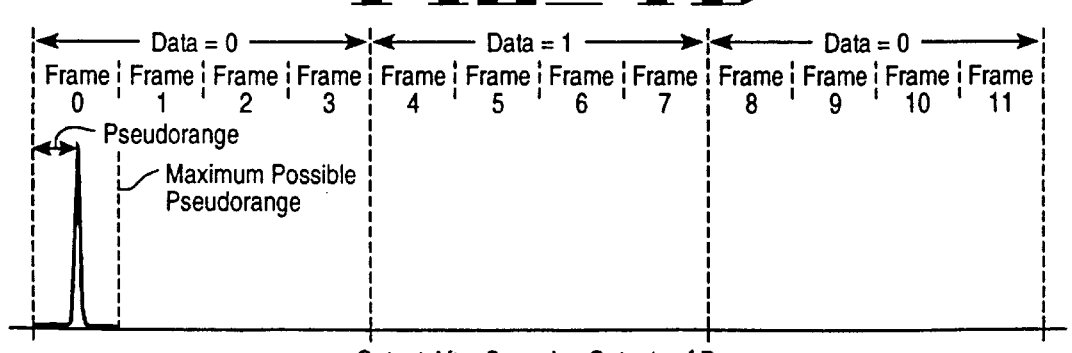
Output After Summing Outputs of D
FIG_4E

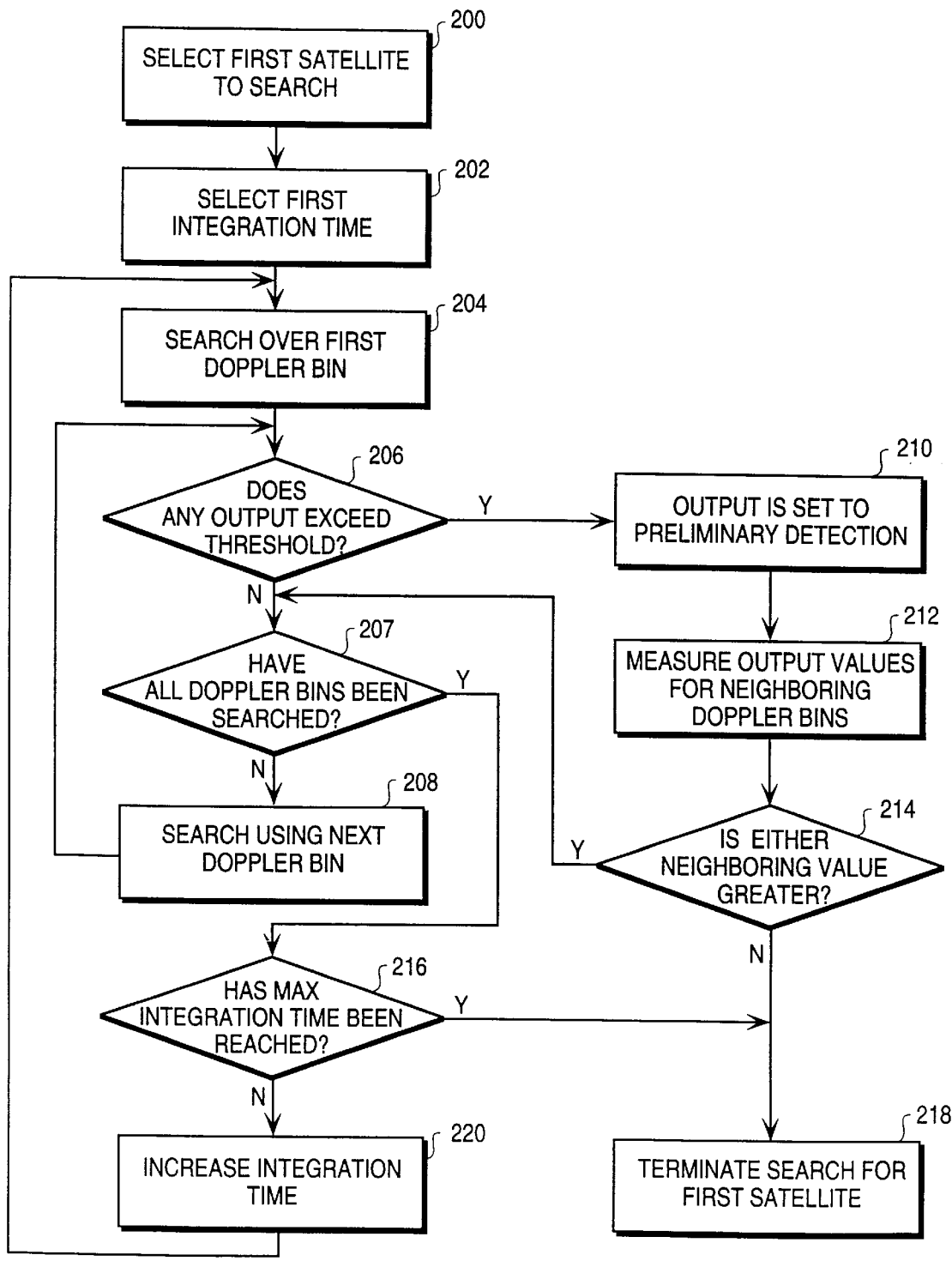

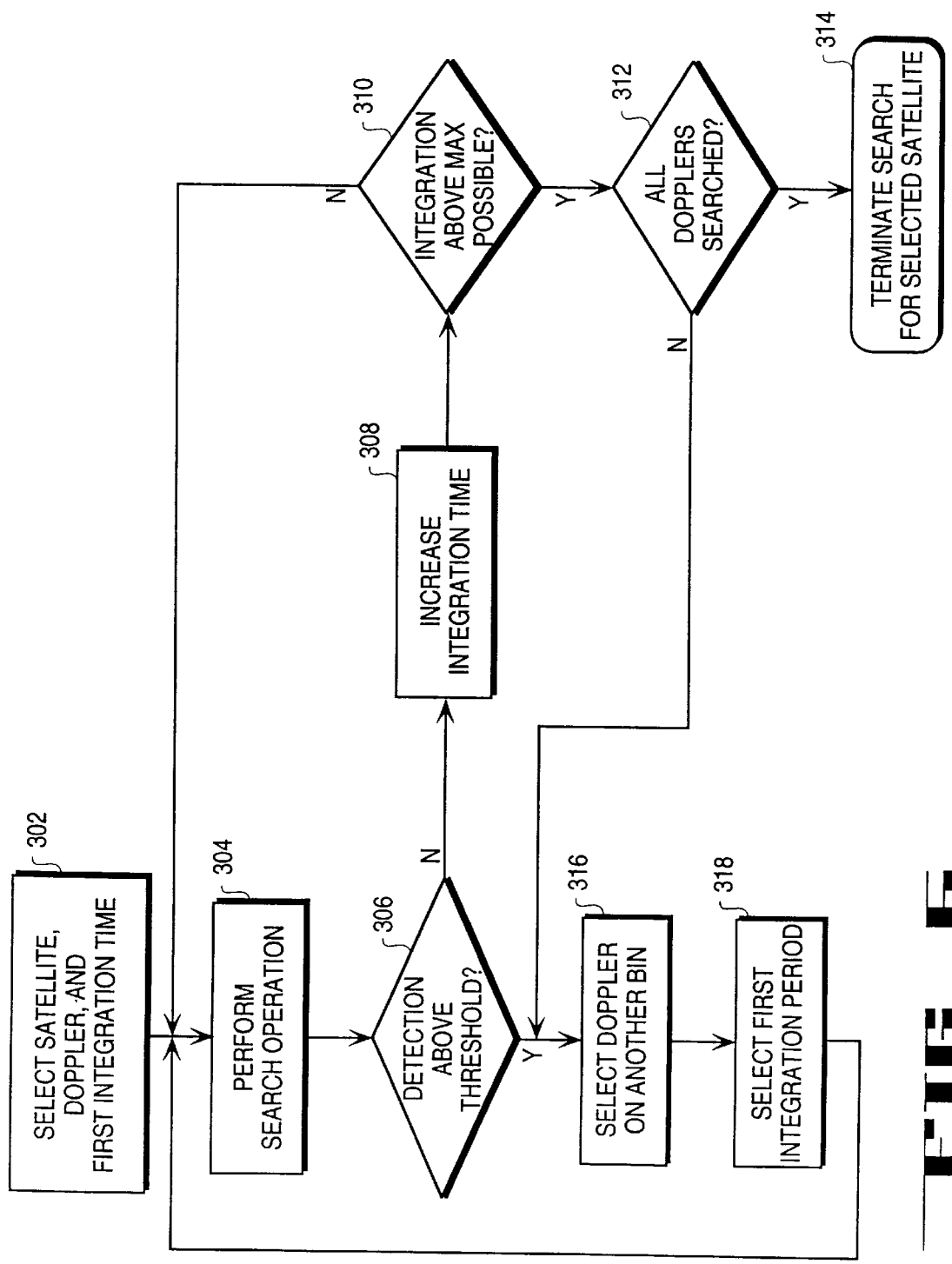
FIG_6

METHOD AND APPARATUS FOR ADAPTIVELY PROCESSING GPS SIGNALS IN A GPS RECEIVER

CROSS REFERENCES TO RELATED APPLICATIONS

The application is related to U.S. patent application Ser. No. 08/612,669, now issued as U.S. Pat. No. 5,663,734, entitled "GPS Receiver and Method for Processing GPS Signals", by the same inventor, Norman F. Krasner, and assigned to the assignee of the present invention.

FIELD OF THE INVENTION

The present invention relates generally to the field of satellite positioning system (SPS) receivers, and more particularly to processing navigational data in SPS receivers.

BACKGROUND OF THE INVENTION

Global Positioning System (GPS) receivers normally determine their position by computing relative times of arrival of signals transmitted simultaneously from a multiplicity of GPS (or NAVSTAR) satellites. These satellites transmit, as part of their message, both satellite positioning data as well as data on clock timing, so-called "ephemeris" data. The process of searching for and acquiring GPS signals, reading the ephemeris data for a multiplicity of satellites and computing the location of the receiver from this data is time consuming, often requiring several minutes. In many cases, this lengthy processing time is unacceptable and, furthermore, greatly limits battery life in miniaturized portable applications.

GPS receiving systems have two principal functions. The first is the computation of the pseudoranges to the various GPS satellites, and the second is the computation of the position of the receiver using these pseudoranges and satellite timing and ephemeris data. The pseudoranges are simply the time delays measured between the received signal from each satellite and a local clock. The satellite ephemeris and timing data is extracted from the GPS signal once it is acquired and tracked. As stated above, collecting this information normally takes a relatively long time (30 seconds to several minutes) and must be accomplished with a good received signal level in order to achieve low error rates.

Most GPS receivers utilize correlation methods to compute pseudoranges. These correlation methods are performed in real time, often with hardware correlators. GPS signals contain high rate repetitive signals called pseudorandom (PN) sequences. The codes available for civilian applications are called C/A (coarse/acquisition) codes, and have a binary phase-reversal rate, or "chipping" rate, of 1.023 MHz and a repetition period of 1023 chips for a code period of 1 millisecond. The code sequences belong to a family known as Gold codes, and each GPS satellite broadcasts a signal with a unique Gold code.

For a signal received from a given GPS satellite, following a downconversion process to baseband, a correlation receiver multiplies the received signal by a stored replica of the appropriate Gold code contained within its local memory, and then integrates, or lowpass filters, the product in order to obtain an indication of the presence of the signal. This process is termed a "correlation" operation. By sequentially adjusting the relative timing of this stored replica relative to the received signal, and observing the correlation output, the receiver can determine the time delay between the received signal and a local clock. The initial determination of the presence of such an output is termed "acquisition." Once acquisition occurs, the process enters the "tracking" phase in which the timing of the local reference is adjusted in small amounts in order to maintain a high correlation output. The correlation output during the tracking phase may be viewed as the GPS signal with the pseudorandom code removed, or, in common terminology, "despread." This signal is narrow band, with a bandwidth commensurate with a 50 bit per second binary phase shift keyed data signal which is superimposed on the GPS waveform.

The correlation acquisition process is very time consuming, especially if received signals are weak. To improve acquisition time, most GPS receivers utilize a multiplicity of correlators (up to 12 typically) which allows a parallel search for correlation peaks.

An alternative acquisition method, as described in U.S. Pat. No. 5,663,734, which is hereby incorporated by reference, provides higher sensitivity and higher processing speed by performing a large number of Fast Fourier Transform (FFT) operations together with special pre-processing and post-processing operations. In this method, received data is frequency downconverted, digitized and then stored in a buffer memory. This data is then operated upon by a programmable digital signal processor which performs the above-mentioned FFT and other operations. In effect, these operations allow for the parallel implementation of a large number (thousands) of correlators. Furthermore, since the operations are performed on a single data set, or "block", they are not subject to the fluctuating signal levels and changing nature of the signal environment common to correlator approaches.

Although the above method provides for rapid acquisition and high sensitivity, it is still necessary to perform the acquisition operations on signals received from several in-view satellites, and for various integration time periods and Doppler offset frequencies. Such multiple operations add considerable time to the acquisition process, especially if these variables are not optimized for a particular acquisition operation.

It is therefore an intended advantage of the present invention to provide a method of adaptively receiving and processing GPS signals by initially performing a block processing operation for optimized parameters such as satellite number, integration period, and Doppler frequency offset.

SUMMARY OF THE INVENTION

A method and apparatus for adaptively processing Global Positioning System (GPS) signals in a GPS receiver is disclosed. In one embodiment of the present invention, the adaptive method of processing GPS signals optimizes the initial acquisition of GPS signals by performing the search using three separate parameters. These parameters include satellite number, Doppler information, and integration time. In one embodiment of the present invention, GPS signals are received for a first satellite of a plurality of in-view GPS satellites. The first satellite is selected based on its position relative to the other in-view satellites, such that the strongest signals are first processed. The signals are stored in a digital snapshot memory and processed using fast convolution methods over a first integration time period and for each of a set of hypothesized Doppler frequencies. If the output from the initial acquisition operation is insufficient to produce a proper pseudorange calculation, one or more of the parameters is altered, and a new acquisition operation is performed.

Other features of the present invention will be apparent from the accompanying drawings and from the detailed description which follows.

BRIEF DESCRIPTION OF THE DRAWINGS

The present invention is illustrated by way of example and not by way of limitation in the figures of the accompanying drawings in which references indicate similar elements and in which:

FIG. 1 is a block diagram of a GPS receiving system utilizing embodiments of the present invention, and shows data links that may exist between a basestation and a remote GPS receiver.

FIG. 2 is a flow chart of operations performed by a processor in the GPS receiving system of FIG. 1, according to an embodiment of the present invention.

FIG. 3 is a more detailed flow chart of the operations illustrated in FIG. 2, according to one embodiment of the present invention.

FIGS. 4A, 4B, 4C, 4D, and 4E illustrate the signal processing waveforms at various stages of processing according to an embodiment of the present invention.

FIG. 5 is a flow chart illustrating the steps of performing adaptive GPS processing in a GPS receiving system, according to one embodiment of the present invention.

FIG. 6 is a flow chart illustrating the steps of performing adaptive GPS processing on a GPS receiving system, according to an alternative embodiment of the present invention.

DETAILED DESCRIPTION

A method and apparatus for adaptively processing navigational data in a Satellite Positioning System (SPS) receiver is described. In one embodiment of the present invention, adaptive strategies used to improve acquisition speed include optimizing the initial search using three variables. These variables include satellite number, integration time period, and Doppler frequency offsets.

In the following discussion, embodiments of the present invention will be described with reference to application in the United States Global Positioning Satellite (GPS) system. It should be evident, however, that these methods are equally applicable to similar satellite positioning systems, such as the Russian Glonass system. Thus, the term "GPS" used herein includes such alternative satellite positioning systems, including the Russian Glonass system. Likewise, the term "GPS signals" includes signals from alternative satellite positioning systems.

Furthermore, although embodiments of the present invention are described with reference to GPS satellites, it will be appreciated that the teachings are equally applicable to positioning systems which utilize pseudolites or a combination of satellites and pseudolites. Pseudolites are ground based transmitters which broadcast a PN code (similar to a GPS signal) modulated on an L-band (or other frequency) carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings or other enclosed areas. The term "satellite", as used herein, is intended to include pseudolites or equivalents of pseudolites, and the term GPS signals, as used herein, is intended to include GPS-like signals from pseudolites or equivalents of pseudolites.

In the following discussion, the terms correlation, convolution and matched filtering are often used. The term "correlation" when applied to two series of numbers means the term by term multiplication of corresponding members of the two series followed by the summation of the series. This is sometimes referred to as "serial correlation" and results in an output that is a single number. In some circumstances, a succession of correlation operations are performed on successive groups of data.

The term "convolution" as applied to two series of numbers is the same as that commonly used in the art and is equivalent to a filtering of the second series of length m with a filter, corresponding to the first series, having an impulse response of length n. The result is a third series of length m+n-1. The term "matched filtering" refers to a convolution, or filtering, operation in which the aforementioned filter has an impulse response which is the time-reversed complex conjugate of the first series. The term "fast convolution" indicates a series of algorithms that computes the convolution operation in an efficient manner.

Some authors utilize the terms correlation and convolution interchangeably; for clarity, however, in this patent, the term correlation always refers to the serial correlation operation described above.

GPS Receiving System

FIG. 1 is a block diagram of a GPS receiving system which is used to implement methods of the present invention. The GPS receiving system of FIG. 1 includes a mobile or remote GPS receiver unit 20 which includes a GPS processing stage and a communication stage. Thus, GPS receiver unit 20 includes circuitry for performing the functions required for processing GPS signals, as well as the functions required for processing communication signals transmitted and received through a communication link. The communication link, such as data link 16, is typically a radio frequency communication link to another communication component, such as a basestation 10 having a communication antenna 14.

In accordance with traditional GPS methods, GPS receiver 20 receives GPS signals transmitted from orbiting GPS satellites and determines the times-of-arrival of unique pseudo-random noise (PN) codes by comparing the time shifts between the received PN code signal sequences and internally generated PN signal sequences. GPS signals are received through GPS antenna 40 and input to an acquisition circuit which acquires the PN codes for the various received satellites. The navigational data (e.g., pseudorange data) produced by the acquisition circuit are processed by a processor for transmission over data communication link 16.

GPS receiver 20 also includes communication transceiver section, shown as modem 22, for communication over data link 16. Modem 22 is coupled to communication antenna 24. Modem 24 transmits navigational data processed by GPS receiver 20 through communication signals (typically radio frequency signals) to a remote basestation, such as basestation 10. The navigational data may be the actual latitude, longitude, and altitude of the GPS receiver, or it may be raw or partially processed data. Received communication signals are input to modem 22 and passed to a processor for processing and possible output through an audio speaker.

According to one embodiment of the present invention pseudorange data generated by GPS receiver 20 is transmitted over data link 16 to basestation 10. Basestation 10 then determines the location of GPS receiver 20 based on the pseudorange data from the combined receiver, the time at which the pseudoranges were measured, and ephemeris data received from its own GPS receiver (e.g., through GPS antenna 12) or other sources of such data. The location data can then be transmitted back to GPS receiver 20 or to other remote locations. The data link 16 between GPS receiver 20 and basestation 10 may be implemented in a number of various embodiments including a direct link or a cellular telephone link.

In one embodiment of the present invention, basestation 10 commands the GPS receiver 20 to perform a location measurement through a message transmitted over data link 16. Within this message, basestation 10 also sends Doppler information for the satellites in view. The Doppler information is a form of satellite data information and is typically in the form of frequency information. The message will typically also specify an identification of the particular satellite in view, or other initialization data. The message is received by modem 22, and is stored in a memory 30 coupled to microprocessor 26. Microprocessor 26 handles data information transfer between the remote unit processing elements 32–48 and the modem 22. As shown in FIG. 1, a serial I/O connection 25 exists between the modem 22 and the microprocessor 26, and EEPROM 28 is coupled to microprocessor 26.

The Doppler information included in the message is typically very short in duration since the required accuracy of such Doppler information is not high. For example, if 10 Hz accuracy were required and the maximum Doppler is approximately ±7 kHz, then an 11-bit word would suffice for each satellite in view. If eight satellites were in view, then 88 bits would be required to specify all such Dopplers. The use of this information eliminates the requirement for remote 20 to search for such Dopplers, thereby reducing its processing time by in excess of a factor of ten. The use of the Doppler information also allows the GPS receiver 20 to more quickly process a sample of GPS signals.

When the GPS receiver 20 receives a command (e.g., from basestation 10) to process GPS signals through a message which includes Doppler information, microprocessor 26 activates the RF to IF Converter 42, analog to digital (A/D) Converter 44 and digital snapshot memory 46 via a battery and power regulator and power switch circuit 36 (and controlled power lines 21a, 21b, 21c and 21d), thereby providing full power to these components. This causes the signal from the GPS satellite which is received via antenna 40 to be downconverted from a radio frequency (RF) to an intermediate frequency (IF), where it subsequently undergoes digitization in A/D converter 44. A contiguous set of such data, typically corresponding to a duration of 100 milliseconds to one second (or even longer), is then stored in snapshot memory 46. The addressing of this memory 46 to store this data is controlled by a Field Programmable Gate Array (FPGA) integrated circuit 48. Downconversion of the GPS signal is accomplished using a frequency synthesizer 38 which provides local oscillator signal 39 to the converter 42 as discussed in further detail below.

During the period of time in which the snapshot memory 46 is being filled with the digitized GPS signals from the in-view satellites, DSP microprocessor 32 may be kept in a low power state. The RF to IF Converter 42 and A/D Converter 44 are typically only turned on for a short period of time, sufficient to collect and store the data required for pseudorange calculation. After the data collection is complete, these converter circuits are turned off or power is otherwise reduced via controlled through lines 21b and 21c (while the memory 46 continues to receive full power), thus not contributing to additional power dissipation during the actual pseudorange calculation. The pseudorange calculation is then performed using, in one embodiment of the present invention, a general purpose, programmable digital signal processing IC 32 (DSP), as exemplified by a TMS320C30 integrated circuit from Texas instruments. DSP 32 is placed in an active power state by the microprocessor 26 and the circuit 36 via controlled power line 21e prior to performing such calculations.

In one embodiment, DSP 32 is a general purpose and programmable processor, as opposed to a specialized custom digital signal processor, as is used in other GPS units. Furthermore, DSP 32 facilitates the use of a Fast Fourier Transform (FFT) algorithm, which permits very rapid computation of the pseudoranges by rapidly performing a large number of correlation operations between a locally generated reference and the received signals. Typically, 2046 such correlations are required to complete the search for the epochs of each received GPS signal. The Fast Fourier Transform algorithm permits a simultaneous and parallel search of all such positions, thus speeding the required computation process by a factor of 10 to 100 over conventional approaches.

Once DSP 32 completes its computation of pseudoranges for each of the in-view satellites, it may compute its final position using satellite ephemeris data supplied to it via a data link or gathered through standard demodulation techniques. Alternatively, it may transmit the pseudoranges to a basestation (e.g., basestation 10), which provides a final position computation.

In one embodiment of the invention, DSP 32 transmits this information to the microprocessor 26 via interconnect bus 33. At this time the microprocessor 26 may cause the DSP 32 and memory 46 to again enter a low power state by sending an appropriate control signal to the battery and power regulator circuit 36. Microprocessor 26 then uses modem 22 to transmit the pseudorange data, or position data over data link 16 to basestation 10 for final position computation or for display on a display device (not shown).

It is expected that the position calculations in DSP 32 will typically require less than a few seconds of time, depending upon the amount of data stored in the digital snapshot memory 46 and the speed of the DSP.

As indicated above, digital snapshot memory 46 captures a record corresponding to a relatively long period of time. The efficient processing of this large block of data using fast convolution methods contributes to the ability of the present invention to process signals at low received levels (e.g., when reception is poor due to partial blockage from buildings, trees, etc.). All pseudoranges for visible GPS satellites are computed using this same buffered data. This provides improved performance relative to continuous tracking GPS receivers in situations (such as urban blockage conditions) in which the signal amplitude is rapidly changing.

FIG. 2 is a flowchart which outlines the major operations performed by GPS receiver 20 in processing received satellite signals to produce a location fix. In step 50, GPS signals from one or more in view GPS satellites are received at GPS receiver 20 through antenna 40. These signals are digitized and stored in a buffer, (e.g., digital snapshot memory 46) in GPS receiver 20, step 52. After storing these signals, a processor (e.g., DSP 32) performs pre-processing, fast convolution processing, and post-processing operations. The processing operations begin with pre-processing steps 54 and 56. In step 54, the stored data is broken into a series of contiguous blocks whose duration are equal to a multiple of the frame period of the pseudorandom (PN) codes contained within the GPS signals. For each block, a compressed block of data is created with a length equal to the duration of a pseudorandom code period, step 56. Each compressed block of data is created by coherently adding together successive subblocks of data, the subblocks having a duration equal to one PN frame. This compression step involves the addition of corresponding sample numbers of each of the subblocks to one another.

In steps 58–60, the processing operations are performed. For each compressed block, a matched filtering operation is performed to determine the relative timing between the received PN code contained within the block of data and a locally generated PN reference signal (e.g. the pseudorandom sequence of the GPS satellite being processed), step 58. In one embodiment of the present invention, the matched filtering operations are performed using fast convolution techniques. In step 60, a pseudorange is determined by performing a magnitude-squared operation on the products created from the matched filtering operation.

In one embodiment of the present invention, the fast convolution technique used in processing the buffered GPS signals in step 58 is a Fast Fourier Transform (FFT) operation. The result of the convolution is produced by computing the product of the forward transform of the compressed block and a pre-stored representation of the forward transform of the pseudorandom sequence. This produces a first result, on which an inverse transformation is performed to recover the result. The effects of Doppler induced time delays and local oscillator induced time errors are compensated for on each compressed block of data by inserting between the forward and inverse Fast Fourier Transform operations, the multiplication of the forward FFT of the compressed blocks by a complex exponential whose phase versus sample number is adjusted to correspond to the delay compensation required for the block.

In steps 62–64, the post-processing operations are performed. In step 62, the magnitude-squared data for all blocks are combined into a single block of data by adding together the blocks of magnitude-squared data to produce a peak. In step 64, the location of the peak of each single block of data is determined using digital interpolation methods. The location is the distance from the beginning of the data block to the peak, and represents a pseudorange to a GPS satellite corresponding to the pseudorandom sequence being processed.

Individual operations comprising the steps of FIG. 2 are provided in greater detail in the flowchart of FIG. 3. FIG. 3 outlines the steps performed in DSP 32 according to one embodiment of the present invention. The process steps described in FIG. 3 will be discussed in relation to the signal waveforms illustrated in FIGS. 4A, 4B, 4C, 4D and 4E. It will be apparent to those skilled in the art that the machine code, or other suitable code, for performing the signal processing to be described is stored in EPROM 34. However, other non-volatile storage devices could also be used. The objective of the signal processing operation illustrated in FIG. 3 is to determine the timing of the received waveform with respect to a locally generated waveform. In order to achieve high sensitivity, a very long portion of such a waveform, typically 100 milliseconds to one second, is processed.

It should be noted that each received GPS signal (C/A mode) is constructed from a high rate (1 MHz) repetitive pseudorandom (PN) pattern of 1023 symbols, commonly called "chips." These "chips" resemble the waveform shown in FIG. 4A. Further imposed on this pattern is low rate data, transmitted from the satellite at 50 baud. All of this data is received at a very low signal-to-noise ratio as measured in a 2 MHz bandwidth. If the carrier frequency and all data rates were known to great precision, and no data were present, then the signal-to-noise ratio could be greatly improved and the data greatly reduced by adding successive frames to one another. For example, there are 1000 PN frames over a period of one second. The first such frame could be coherently added to the second frame, the result then added to the third frame, and so on. The result would be a signal having a duration of 1023 chips. The phasing of this sequence could then be compared to a local reference sequence to determine the relative timing between the two sequences, thus establishing the so-called pseudorange.

The above process must be carried out separately for each satellite in view from the same set of stored received data in the snapshot memory 46. This is because the GPS signals from different satellites generally have different Doppler frequencies and their PN patterns differ from one another.

The above process is made difficult by the fact that the carrier frequency may be unknown by in excess of 5 kHz due to signal Doppler uncertainty and by an additional amount due to receiver local oscillator uncertainty. In some cases these Dopplers and local oscillator uncertainties can be reduced by transmitting auxiliary data to the GPS receiver from the basestation. However, the methods of this invention apply both to situations in which such auxiliary information is used, and situations in which such auxiliary information is not used.

The presence of 50 baud data superimposed on the GPS signal limits the coherent summation of PN frames beyond a period of 20 milliseconds. That is, at most 20 frames may be coherently added before data sign inversions prevent further processing gain. Additional processing gain may be achieved through matched filtering and summation of the magnitudes (or squares of magnitudes) of the frames, as detailed in the following paragraphs.

The process illustrated in FIG. 3 begins at step 100 with a command from basestation 10 to GPS receiver 20 over data link 16 to initialize a GPS processing operation. Such a command may be termed a "Fix Command", as shown in step 100. Beside the command to initialize a location fix, the Fix Command may include the Doppler shifts for each satellite in view and an identification of those satellites. At step 102, the GPS receiver 20 computes its local oscillator drift by frequency locking to the signal transmitted from basestation 10. Alternatively, a high quality temperature compensated crystal oscillator in GPS receiver 20 could be used.

At step 104 the microprocessor 26 in GPS receiver 20 turns on power to the receiver front end 42, A/D converters 44 and digital snapshot memory 46. Microprocessor 26 then collects a snapshot of data of duration K PN frames of the C/A (coarse/acquisition) code, where the value of K is typically 100 to 1000 (corresponding to a 100 millisecond to 1 second time duration). When a sufficient amount of data has been collected, microprocessor 26 turns off the RF to IF converter 42 and the A/D converters 44.

The pseudorange of each satellite is computed in turn as follows: first, at step 106 for the given GPS satellite signal to be processed, the corresponding pseudorandom code (PN) is retrieved from EPROM 34. As explained below, the preferred PN storage format is actually the Fourier transform of this PN code, sampled at a rate of 2048 samples per the 1023 PN bits.

The data in snapshot memory 46 is processed in blocks of N consecutive PN frames, that is, blocks of 2048N complex samples (where N is an integer typically in the range 5 to 10). Similar operations are performed on each block as shown in the bottom loop (steps 108–124) of FIG. 3. That is, this loop is performed a total of K/N times for each GPS signal to be processed.

At step 108 the 2048N data words of the block are multiplied by a complex exponential that removes the effects of Doppler on the signal carrier, as well as the effects of local oscillator drift in the receiver. To illustrate, suppose the Doppler frequency transmitted from basestation 10 plus local oscillator offsets corresponded to $f_e$ Hz, the premultiplication of the data would then take the form of the function $e^{-j2\pi f_e nT}$, where n=[0, 1, 2, . . . , 2048N−1]+(B−1)×2048N, where T=1/2.048 MHz is the sampling period, and the block number B ranges from 1 to K/N.

Next, at step 110, the adjacent groups of N (typically 10) frames of data within the block are coherently added to one another. That is, samples 0, 2048, 4096, . . . , 2048(N−1)−1 are added together; then samples 1, 2049, 4097, . . . , 2048(N−1) are added together, and so on. At this point the block contains only 2048 complex samples. An example of the waveform produced by such a summing operation is illustrated in FIG. 4B for the case of four PN frames. This summing operation may be considered a pre-processing operation which precedes the fast convolution operations.

Next, at steps 112–118, each of the averaged frames undergoes a matched filtering operation. The purpose of the matched filtering operations is to determine the relative timing between the received PN code contained within the block of data and a locally generated PN reference signal. Simultaneously, the effects of Doppler on the sampling times is also compensated. In one embodiment of the present invention, fast convolution operations such as Fast Fourier Transform (FFT) algorithms used in a manner to perform circular convolution, are used. The use of these FFT algorithms greatly speeds the matched filtering operation. It should be noted that in order to simplify the discussion that follows regarding the fast convolution process, the above mentioned Doppler compensation is initially neglected.

The basic operation to be performed is a comparison of the data in the block being processed (2048 complex samples) to a similar reference PN block stored locally. The comparison is actually done by (complex) multiplying each element of the data block by the corresponding element of the reference and summing the results. This comparison is termed a "correlation." However, an individual correlation is only done for one particular starting time of the data block, whereas there are 2048 possible positions that might provide a better match. The set of all correlation operations for all possible starting positions is termed a "matched filtering" operation. The full matched filtering operation is required in one embodiment of the present invention.

The other times of the PN block can be tested by circularly shifting the PN reference and repeating the same operation. That is, if the PN code is denoted p(0) p(1) . . . p(2047), then a circular shift by one sample is p(1) p(2) . . . p(2047) p(0). This modified sequence determines whether the data block contains a PN signal beginning with sample p(1). Similarly the data block may begin with samples p(2), p(3), etc . . . , and each may be tested by circularly shifting the reference PN and repeating the tests. It should be apparent that a complete set of tests would require 2048× 2048=4,194,304 operations, each requiring a complex multiplication and addition.

A more efficient, mathematically equivalent method may be employed using the Fast Fourier Transform (FFT), which requires only approximately 12×2048 complex multiplications and twice the number of additions. In this method, the FFT is taken for the data block, at step 112, and for the PN block. The FFT of the data block is multiplied by the complex conjugate of the FFT of the reference, at step 114, and the results are inverse Fourier transformed at step 118. The resulting data is of length 2048 and contains the set of correlations of the data block and the PN block for all possible positions. Each forward or inverse FFT operation requires P/2 log$_2$ P operations, where P is the size of the data being transformed (assuming a radix-2 FFT algorithm is employed). For the case of interest, P=2048, so that each FFT requires 11×1024 complex multiplications. However, if the FFT of the PN sequence is prestored in EPROM 34, as in a preferred embodiment, then its FFT need not be computed during the filtering process. The total number of complex multiplications for the forward FFT, inverse FFT and the product of the FFTs is thus (2×11+2)×1024=24,576, which is a savings of a factor of 171 over direct correlation. FIG. 4C illustrates the waveform produced by this matched filtering operation.

One embodiment of the present invention uses a sample rate such that 2048 samples of data are taken over the PN period of 1023 chips. This allows the use of FFT algorithms of length 2048. In general, FFT algorithms that are a power of two or four are normally much more efficient than those of other sizes (and 2048=2$^{11}$). Hence the sampling rate so chosen significantly improves the processing speed. It is preferable that the number of samples of the FFT equal the number of samples for one PN frame so that proper circular convolution may be achieved. That is, this condition allows the test of the data block against all circularly shifted versions of the PN code, as discussed above. A set of alternative methods, known as "overlap save" or "overlap add" convolutions may be utilized if the FFT size is chosen to span a number of samples different from that of one PN frame length. These approaches require approximately twice the number of computations than in the embodiment described above.

It should be apparent to one skilled in the art how the above process may be modified by utilizing a variety of FFT algorithms of varying sizes together with a variety of sample rates to provide fast convolution operations. In addition, a set of fast convolution algorithms exist which also have the property that the number of computations required are proportional to P log$_2$P rather than P$^2$ as is required in straightforward correlation. Many of these algorithms are enumerated in standard references, for example, H. J. Nussbaumer, "Fast Fourier Transform and Convolution Algorithms", New York, Springer-Verlag, 1982. These algorithms may be employed in alternative embodiments of the present invention.

The method of time Doppler compensation employed at step 116 is now explained. In one embodiment, the sample rate utilized may not correspond exactly to 2048 samples per PN frame due to Doppler effects on the received GPS signal as well as local oscillator instabilities. For example, it is known that the Doppler shift can contribute a delay error of ±2700 nanoseconds per second. In order to compensate for this effect, the blocks of data processed in the above description need to be time shifted to compensate for this error. As an example, if the block size processed corresponds to five PN frames (5 milliseconds), then the time shift from one block to another could be as high as ±13.5 nanoseconds. Similar time shifts result from local oscillator instability. These shifts may be compensated for by time shifting the successive blocks of data by multiples of the time shift required by a single block. That is, if the Doppler time shift per block is d, then the blocks are time shifted by nd, where n=0, 1, 2, and so on.

In general these time shifts are fractions of a sample. Performing these operations directly using digital signal processing methods involves the use of nonintegral signal interpolation methods and results in a high computation burden. In one embodiment of the present invention, the processing is incorporated within the fast Fourier transform functions. It is well-known that a time shift of d seconds is equivalent to multiplying the Fourier Transform of a function by $e^{-j2\pi fd}$, where f is the frequency variable. Thus, the time shift may be accomplished by multiplying the FFT of the data block by $e^{-j2\pi nd/T}_f$ for n=1, 2, . . . , 1023 and by $e^{-j2\pi(n-2048)d/T}_f$ for n=1024, 1025, . . . , 2047, where $T_f$ is the PN frame duration (1 millisecond). This compensation adds only about eight percent to the processing time associated with the FFT processing. The compensation is broken into two halves in order to guarantee continuity of phase compensation across 0 Hz.

After the matched filtering operation is complete, the magnitudes, or magnitudes-squared, of the complex numbers of the block are computed at step 120. Either of these nonlinear operations is termed a "detection" operation. In most cases, either the magnitudes or magnitudes-squared will work equally well. The magnitude-squaring operation removes effects of 50 Hz data phase reversals (as shown in FIG. 4D) and low frequency carrier errors that remain. The block of 2048 samples is then added to the sum of the previous blocks processed at step 122. Step 122 may be considered a post-processing operation which follows the fast convolution operation performed in steps 112–118. The fast convolution operations, steps 112–118 continue until all K/N blocks are processed, as determined in the decision block at step 124. When all the K/N blocks are processed, there remains one block of 2048 samples, from which a pseudorange is calculated. FIG. 4E illustrates the resulting waveform after the final summing operation of step 122.

Pseudorange determination occurs at step 126. A peak is searched for above a locally computed noise level. If such a peak is found, its time of occurrence relative to the beginning of the block represents the pseudorange associated with the particular PN code and the associated GPS satellite.

In one embodiment of the present invention, an interpolation routine is utilized at step 126 to find the location of the peak to an accuracy much greater than that associated with the sample rate (2.048 MHz). The interpolation routine depends upon the prior bandpass filtering used in the RF/IF portion of the GPS receiver 20. A good quality filter will result in a peak having a nearly triangular shape with the width of the base equal to four samples. Under this condition, following subtraction of an average amplitude (to remove a DC baseline), the largest two amplitudes may be used to determine the peak position more precisely. Suppose these amplitudes are denoted $A_p$ and $A_{p+1}$, where $A_p \geq A_{p+1}$, without loss of generality, and P is the index of the peak amplitude. Then the position of the peak relative to that corresponding to $A_p$ may be provided by the formula:

peak location=$p+A_p/(A_p+A_{p+1})$

For example if $A_p=A_{p+1}$, then the peak location is found to be p+0.5, that is, halfway between the indices of the two samples. In some situations the bandpass filtering may round the peak and a three-point polynomial interpolation may be more suitable.

In the preceding processing, a local noise reference used in thresholding, may be computed by averaging all the data in the final averaged block, after removing the several largest such peaks.

Once the pseudorange is found, the processing continues at step 128 in a similar manner for the next satellite in view, unless all such satellites have been processed. Upon completion of the processing for all such satellites, the process continues at step 130 where the pseudorange data is transmitted over data link 16 to the basestation 10, where, in one embodiment of the present invention, the final position calculation of the remote GPS receiver is performed. Finally, at step 132, the majority of the circuitry of GPS receiver 20 is placed in a low power state, awaiting a new command to perform another positioning operation. FIG. 3 assumes that only one Doppler is used to produce the PN code. In practice however, several Doppler frequencies are employed in a sequence of searches for the given PN. Thus, the processing loop from step 106 through step 128 may be traversed multiple times for a given PN code corresponding to a succession of Doppler frequencies.

Adaptive Processing

In one embodiment of the present invention, an adaptive method of processing GPS signals is used which takes into account several different parameters. These parameters include satellite number, integration time, and Doppler information. Thus, in one embodiment of the present invention, the block processing method previously described in reference to the flowcharts of FIGS. 2 and 3 is performed for particular in-view satellites, for particular time intervals, and for each of a set of hypothesized Doppler frequencies. For example, by first processing the strongest satellite signals for the shortest possible integration time, and for a minimum number of Doppler frequency offsets, GPS signal acquisition time can be greatly reduced over present GPS signal processing methods.

One important factor in determining how quickly a GPS receiver can acquire a GPS signal is the strength of the satellite signal received by the GPS receiver. In many instances this depends on which particular satellite signal the GPS receiver is attempting to acquire. GPS systems generally provide several satellites that are in-view of a GPS receiver at any point in time. For example, the U.S. Global Positioning System (GPS) Orbital Constellation consists of 24 satellites which orbit the earth in 12 hour orbits. The satellites are arranged in six orbital planes each containing four satellites. The orbital planes are spaced 60 degrees apart from each other and are inclined approximately 55 degrees with respect to the equatorial plane. This constellation provides a user with approximately five to eight satellites that are visible from any point on earth. To determine its location, a GPS receiver must determine the times-of-arrival of the PN codes for a certain minimum number of satellites in view, and therefore, such a search must be done in turn for each of the several of the satellites in view. The time to perform this search may be very lengthy, especially under low input signal-to-noise ratio situations.

The lines-of-sight to the various satellites differ from satellite to satellite given the relative position of the satellites in their orbits. Because of these variations, signals from certain satellites may be weaker, in terms of signal-to-noise ratio, than signals from other satellites. For example, signals from low satellites (i.e., those near the horizon) may be blocked by obstructions, such as trees, hills, or buildings. The strongest signals are often (but not always) available from satellites that are directly above, or nearly directly above the GPS receiver.

Another factor which affects the amount of time required to acquire a GPS signal is the time interval used to perform the GPS signal processing operation. In a block processing method of GPS signal processing, as described previously, a number of PN frames are coherently added over a particular time period. Although a digital buffer in the GPS receiver may store data corresponding to a long time interval (e.g., one second), it may be possible to process a shorter portion of this interval for a given satellite and still obtain a reasonably accurate measurement of the pseudorange. This is especially true for those satellite signals that are little attenuated by obstructions or other blockage conditions, such as those from overhead satellites that offer good visibility. For signals from satellites that are lower in the sky and may encounter heavy attenuation (as is common in urban environments or "urban canyons"), a longer time interval may be required. Thus, the time interval, also referred to as the integration time period, used to perform coherent addition of subblocks of satellite data may be varied to produce faster or slower acquisition times.

A third factor which affects the amount of time required to acquire a GPS signal is Doppler information. It should be noted that even when Doppler frequencies are transmitted from a basestation and when a local frequency reference is very stable, it is still normally the case that some search over Doppler must be made. Typically, if the number of PN frames coherently added in step 56 of FIG. 2 corresponds to a time interval T, then a Doppler search must be done with successive frequency hypotheses not greater than 0.5/T in order to avoid sensitivity losses less than 1 dB. The set of Doppler frequencies used will be referred to as a set of "Doppler bins." For example, if the Doppler uncertainty is ±250 Hz and the pre-detection summation occurs for ten frames of data, or 10 milliseconds, then the bin spacing should be no greater than 0.5/10 milliseconds, or 50 Hz. Thus, relative to an initial frequency, nine bins with frequency offsets from −200 Hz to +200 Hz might be suitable for such a search.

In one embodiment of the present invention, GPS receiver 20 performs a satellite signal acquisition operation, in which the process is adaptively performed by optimizing for a particular satellite number, a particular time interval, and for particular Doppler bins. Thus, the acquisition process is optimized by searching for the strongest signal first, using the shortest time interval for signal processing, and for a minimal set of Doppler frequencies.

FIG. 5 is a flowchart which illustrates the steps comprising adaptive GPS processing according to a method of the present invention. In step 200, a search is first conducted for the satellite which is most directly overhead of the GPS receiver, that is, the satellite whose signals are most downwardly incident to the GPS receiver. For this embodiment, it is assumed that the most overhead satellite provides the strongest signal-to-noise ratio signal at the GPS receiver. For this satellite, a relatively short integration time (e.g., 50 milliseconds) is selected, step 202. The integration time selected in step 202 determines the portion of data stored in buffer memory upon which a matched filtering operation is performed (e.g., in step 58 of FIG. 2).

For the particular satellite and integration time selected, a search is performed for each of a set of Doppler bins. In step 204, the search begins at a particular Doppler bin. For purposes of efficiency, the middle bin is first selected. If further searches are required, the searches are conducted in turn on successively increasing offset frequencies based on the Doppler bin spacing. For example, if the bin spacing is 50 Hz, the first search is conducted for a bin frequency offset of 0 Hz; the second search is conducted for a bin frequency offset of +50 Hz; the third search is conducted for a bin frequency offset of −50 Hz; the fourth search is conducted for a bin frequency offset of +100 Hz; the fifth search is conducted for a bin frequency offset of −100 Hz; and so on, as further searches over Doppler bins are required.

Each search over a particular Doppler bin produces a set of outputs (typically 2048) from the matched filter operation, as described previously. If, in step 206, it is determined that no output of the search exceeds a noise riding threshold, the search continues using the next Doppler bin, step 208, unless it is first determined in step 207 that all bins have been searched. The output for this next Doppler bin is then tested in step 206. If it is determined in step 206 that any output exceeded the noise riding threshold, then a preliminary detection is declared, step 210. When a detection is determined in step 206, measurements for neighboring Doppler offsets are examined to determine if detections are found for these offsets and if the signal strength for the original Doppler bin is greater than the signal strength of each of the neighboring bins, step 212. If, in step 214, it is determined that a neighboring Doppler bin does yield a stronger signal, the acquisition process proceeds from steps 207 and 208 in which the next Doppler bin is searched. However, if in step 214, it is determined that none of the neighboring Doppler bins yields a stronger signal, then this Doppler bin provides the final detection result and processing for the initial satellite is terminated, step 218.

If, in step 207, it is determined that no detections were found for all Doppler bins, then a longer integration time is selected for the given satellite, step 220. At this point the process repeats from step 204 in which the search is conducted for the initial satellite over the first Doppler bin for the new time interval. After each search operation, the integration time is checked to determine whether a maximum integration time has been reached, step 216. This iterative searching process continues until a detection is made or until the maximum integration time is used.

The use of an adaptive search process over particular Doppler bins using the comparative process described above typically saves considerable time in the initial acquisition of the first satellite signal over present GPS receiving methods.

Once a search operation is completed for the first satellite, a search operation is performed for a second satellite. In one embodiment of the present invention, if a detection was made for the first satellite, then the Doppler offset corresponding to that satellite is used as the initial Doppler frequency offset for the search on the second satellite. This approach capitalizes on the fact that certain sources of error, such as local oscillator drift, may be common to the processing of a multiplicity of satellite signals. The second satellite's signal is then searched in a manner similar to that of the first satellite. If a detection for the second satellite is made with a suitable output signal-to-noise ratio, then the processing of the second satellite terminates. If detections are made for multiple satellites, an average, or weighted average (weighted by the signal-to-noise ratio) of their Doppler offsets may be used to initialize the Doppler search corresponding to the other satellites. The above processing continues until all in-view satellites are searched.

In the above example, if the initial integration time was 50 milliseconds and the best Doppler offset was zero, then it may have been the case that only three Dopplers were examined. If this is compared with a search using a one second integration time and nine Dopplers (as in the previous example), then the search time is reduced by a factor of 60 to 1, as provided by the following calculation:

(1 second/50 milliseconds)×(9 bins/3 bins)

Furthermore, even for the weaker satellite signals, correct initialization of Doppler offset could result in substantial savings in processing time.

Although the above embodiment described an adaptive process in which the integration time was varied for a particular satellite before other satellites were searched, other embodiments of the present invention may involve varying different combinations of satellite number, integration time, and Doppler frequency, in different orders. For example, in an alternative embodiment of the present invention, a search is first conducted for a given integration time across all Doppler bins and all in-view satellites. If no detections or only minimal detections are produced, the integration time is increased, and the search is re-performed over the same Doppler bins and satellites. This approach is appropriate in cases where there may be no prior knowledge or indication of which satellite signals are preferable (e.g., corresponding to satellites higher in the sky).

In a further alternative embodiment of the present invention, once a detection is made for a given combination of satellite number, Doppler, and integration time, the integration time might be increased for the given satellite and Doppler until the signal-to-noise ratio exceeds the threshold for adequate pseudorange accuracy. The neighboring Dopplers for this satellite would then be similarly analyzed (to determine maximum SNR versus Doppler) by varying the integration times for these searches.

FIG. 6 is a flowchart illustrating the steps of performing adaptive GPS processing in a GPS receiving system, according to this alternative embodiment of the present invention. In step 302, a combination of a first integration time and Doppler bin for a particular satellite is selected. A search operation is then performed for this combination, step 304. In step 306 it is determined whether an output for the detection operations in the search operation exceeds a noise riding threshold. If in step 306 it is determined that an output does exceed the noise riding threshold, another Doppler bin is selected, step 316. The first integration time period for the satellite is then reselected for this new Doppler bin, step 318. The process is then repeated from step 304 with a new search operation performed using this new Doppler bin.

If, however, in step 306 it is determined that an output for the detection operation does not exceed the noise riding threshold, the integration time is increased, step 308. In step 310, it is determined whether the increased integration time exceeds a pre-defined maximum possible integration time. If the increased integration time does not exceed the maximum possible time, the process proceeds from step 304 with a new search operation performed for the new integration time.

If, however, in step 310 it is determined that the new integration time does exceed the maximum possible time, it is determined whether search operations have been performed over all of the possible Doppler bins, step 312. If searches over all of the Doppler bins have been performed, the search process is terminated for the selected satellite, step 314. If, however, searches over all of the Doppler bins have not been performed, the process proceeds from step 316 in which another Doppler bin is selected, and a new search operation is performed using the new Doppler bin.

The embodiment illustrated in FIG. 6 offers the advantage of increasing integration time without requiring additional storage and without discarding previously processed data. This is because each detection operation is performed on a set of data from the summed post-detected data from the FFT processor, which corresponds typically to 2048 numbers. Each number represents energy present at a given time delay from zero to one millisecond in increments of 1 millisecond/2048. The time delay is the pseudorange modulo one millisecond (the PN frame period). Thus, an integration for 50 milliseconds, yields 2048 numbers. To integrate for another 50 milliseconds, the detected outputs of the FFT are continually added to this set of 2048 numbers. Thus, no past data is lost and no additional storage is required.

If, however, a different Doppler is used, then another set of 2048 numbers is produced and either the prior 2048 numbers corresponding to a different Doppler is discarded or else it must be saved. This latter approach is appropriate in cases where storage of large quantities of data is possible, but may be inappropriate in receiver systems with limited memory resources.

In the foregoing, a system has been described for adaptively processing navigational data in a GPS receiver. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than restrictive sense.

What is claimed is:

1. A method of determining pseudoranges in a global positioning system (GPS) receiver, said method comprising the steps of:
   receiving a plurality of signals from a plurality of in-view GPS satellites;
   storing said plurality of signals in a digital snapshot memory to produce stored data;
   selecting a first satellite for processing from said plurality of in-view satellites based on a position of said first satellite relative to other satellites of said plurality of in-view GPS satellites;
   selecting a first integration time period that determines a portion of said stored data to process;
   selecting a first Doppler frequency offset with which to process said portion of said stored data to determine a pseudorange for said first satellite; and
   processing said portion of said stored data from said first satellite for said Doppler frequency offset.

2. The method of claim 1 wherein said first satellite is positioned more directly above said GPS receiver than said other satellites of said plurality of in-view satellites.

3. The method of claim 1 further comprising the steps of:
   processing said stored data in a digital signal processor by,
      breaking said stored data into a series of contiguous blocks whose durations are equal to a multiple of the frame period of pseudorandom (PN) codes contained within said signal;
      for each block, creating a compressed block of data with length equal to the duration of a pseudorandom code period by coherently adding together successive subblocks of data, said subblocks having a duration equal to one PN frame; and
      for each compressed block, performing a matched filtering operation to determine relative timing between the received PN code contained within the block of data and a locally generated PN reference signal, said matched filtering operation utilizing fast convolution techniques, and said matched filtering operation producing an output.

4. The method of claim 3 wherein said successive subblocks of data are coherently adding together during said first integration time period.

5. The method of claim 4 further comprising the steps of:
   selecting said first Doppler frequency offset from a plurality of Doppler frequency offsets within a range of Doppler frequency offsets;
   comparing said output of said matched filtering operation with a noise threshold;
   processing said portion of said stored data from said first satellite for one or more additional Doppler frequency offsets within said range of Doppler frequency offsets if said output exceeds said noise threshold; and comparing the signal strength of said output with the signal strength of outputs produced by processing said portion of said stored data for said one or more additional Doppler frequency offsets.

6. The method of claim 5 further comprising the step of terminating said method for said satellite if said signal strength for said output exceeds said signal strength of said outputs produced by said one or more additional Doppler frequency offsets, and if said signal strength for said output exceeds a predetermined threshold level.

7. The method of claim 6 further comprising the step of determining said pseudorange by performing a detection operation on the products created from said matched filtering operation and combining said detected data for all blocks into a single block of data by adding together said blocks of detected data to produce a peak, the location of said peak being determined using digital interpolation methods and corresponding to said pseudorange.

8. The method of claim 7 wherein said matched filtering operation comprises the step of performing a convolution of the compressed block's data against the pseudorandom sequence (PRS) of said satellite, said convolution being performed using said fast convolution algorithms to produce a product of the convolution.

9. The method of claim 8 wherein said fast convolution algorithm is a Fast Fourier Transform and the product of said convolution is produced by computing the forward transform of said compressed block and multiplying the forward transform of said compressed block by a restored representation of the forward transform of the PRS to produce a first result and then performing an inverse transformation of said first result to recover said product.

10. A method of determining pseudoranges in a global positioning system (GPS) receiver, said method comprising the steps of:

receiving a plurality of GPS signals from a plurality of in-view GPS satellites;

storing said plurality of GPS signals in a memory;

selecting for processing a first satellite from said plurality of in-view satellites based on a position of said first satellite relative to other satellites of said plurality of in-view GPS satellites, said GPS signals comprising pseudorandom sequences;

selecting a first integration time period that determines a portion of data in said memory to process;

selecting a first Doppler frequency offset with which to process said portion of data to determine a pseudorange for said first satellite; and computing a pseudorange for said first satellite by performing a plurality of fast convolutions on a corresponding plurality of blocks of data within said portion of data to provide a plurality of corresponding results of each fast convolution and summing a plurality of mathematical representations of said plurality of corresponding results to obtain a first position information.

11. The method of claim 10 further comprising the steps of:

selecting said first Doppler frequency offset from a plurality of Doppler frequency offsets within a range of Doppler frequency offsets; and performing said step of computing a pseudorange by processing a signal from said first satellite within said portion of data for said first Doppler frequency offset.

12. The method of claim 11 further comprising performing said step of computing a pseudorange by processing said signal from said first satellite within said portion of data for each remaining Doppler frequency offset of said plurality of Doppler frequency offsets within said range of Doppler frequency offsets, each processing operation for said each remaining Doppler frequency offset producing a corresponding output signal.

13. The method of claim 12 further comprising the steps of:

comparing each said corresponding output signal with a noise threshold level to produce one or more intermediate outputs;

comparing each intermediate output with other intermediate outputs of said one or more intermediate outputs to determine a maximum intermediate output; and comparing said maximum intermediate output with an output threshold value.

14. The method of claim 13 further comprising the steps of:

increasing said first integration time period to a second integration time period that corresponds to a larger portion of data in said memory if said maximum intermediate output does not exceed said output threshold value; and performing said step of computing pseudoranges by processing said signals from said first satellite over said larger portion of data and for said first Doppler frequency offset.

15. The method of claim 13 further comprising the step of terminating said processing operation for said first satellite if said maximum intermediate output exceeds said output threshold value.

16. The method of claim 15 further comprising the steps of:

processing a GPS signal from a second satellite of said plurality of in-view GPS satellites, said second satellite selected from said plurality of in-view satellites based on a position of said second satellite relative to other satellites of said plurality of in-view GPS satellites; and computing a pseudorange by processing said GPS signal from said second satellite over said portion of data and for a Doppler frequency offset derived from said maximum intermediate output.

17. The method of claim 13 wherein said first satellite is positioned more directly above said GPS receiver than said other satellites of said plurality of in-view satellites.

18. The method of claim 13 wherein said step of performing said plurality of fast convolutions on said corresponding plurality of blocks of data representing said GPS signals is performed using Fast Fourier Transform processes.

19. A method of determining pseudoranges in a global positioning system (GPS) receiver, said method comprising the steps of:

receiving GPS signals from a plurality of in-view GPS satellites, said GPS signals comprising pseudorandom sequences;

storing said GPS signals in a memory;

selecting for processing a first satellite from said plurality of GPS satellites;

selecting an integration time period that determines a portion of data in said memory to process;

selecting a first Doppler frequency offset with which to process said signals to determine a pseudorange for said first satellite; and computing pseudoranges for said GPS satellites by performing a plurality of fast convolutions on a corresponding plurality of blocks of data within said portion of data to provide a plurality of corresponding results of each fast convolution and summing a plurality of mathematical representations of said plurality of corresponding results to obtain a first position information.

20. The method of claim 19 further comprising the steps of:
  selecting said first Doppler frequency offset from a plurality of Doppler frequency offsets within a range of Doppler frequency offsets; and
  performing said step of computing pseudoranges by processing said signal from said first satellite over said portion of data and for said first Doppler frequency offset.

21. The method of claim 20 further comprising performing said step of computing pseudoranges by processing said signal from said first satellite over said portion of data for each remaining Doppler frequency offset of said plurality of Doppler frequency offsets within said range of Doppler frequency offsets, each processing operation for said each remaining Doppler frequency offset producing a corresponding output signal.

22. The method of claim 21 further comprising the steps of:
  comparing each said corresponding output signal with a noise threshold level to produce one or more intermediate outputs;
  comparing each intermediate output with other intermediate outputs of said one or more intermediate outputs to determine a maximum intermediate output; and
  comparing said maximum intermediate output with an output threshold value.

23. The method of claim 22 further comprising the step of terminating said processing operation for said first satellite if said maximum intermediate output exceeds said output threshold value.

24. The method of claim 22 further comprising the steps of:
  processing a GPS signal from a second satellite of said plurality of in-view GPS satellites if said maximum intermediate output does not exceed said output threshold value; and
  performing said step of computing pseudoranges by processing said signal from said second satellite over said portion of data and for a first Doppler frequency offset of said second second satellite.

25. The method of claim 24 wherein said step of performing said plurality of fast convolutions on said corresponding plurality of blocks of data within said portion of data is performed using Fast Fourier Transform processes.

26. A GPS receiver apparatus comprising:
  an antenna for receiving GPS signals at an RF frequency from a plurality of in-view satellites;
  a downconverter coupled to said antenna, said downconverter reducing the RF frequency of said received GPS signals to an intermediate frequency (IF) to produce a baseband signal;
  a digitizer coupled to said downconverter and receiving said baseband signal, said digitizer sampling said baseband signal at a predetermined rate to produce a sampled baseband signal;
  a memory coupled to said digitizer, said memory storing a data record of said sampled baseband signal during a predetermined time period; and
  a digital signal processor (DSP) coupled to said memory, said DSP performing fast convolution operations, wherein said DSP processes a portion of said data record to process a signal from a first satellite of said plurality of in-view satellites by performing a plurality of fast convolution operations on a corresponding plurality of blocks of said portion of said data record to provide a plurality of corresponding results of each fast convolution operation and summing a plurality of mathematical representations of said plurality of corresponding results to obtain a position information, and wherein said DSP is further operable to perform said plurality of fast convolution operations for a first Doppler frequency offset, said first Doppler frequency offset being selected from a plurality of Doppler frequency offsets within a range of Doppler frequency offsets.

27. The GPS receiver apparatus of claim 26 wherein said first satellite of said plurality of in-view satellites is selected based on a position of said GPS receiver apparatus relative to other satellites of said plurality of in-view satellites.

28. The GPS receiver apparatus of claim 27 wherein said DSP is further operable to:
  perform said plurality of fast convolution operations for each remaining Doppler frequency offset of said plurality of Doppler frequency offsets within said range of Doppler frequency offsets; and
  compare the outputs from each of said plurality of fast convolution operations with a noise threshold level.

29. The GPS receiver apparatus of claim 28 further operable to:
  increase said portion of data to a larger portion of data if none of said outputs exceeds said noise threshold level; and
  perform said plurality of fast convolution operations on a corresponding plurality of blocks within said larger portion of data.

30. The GPS receiver apparatus of claim 28 further operable to:
  process a GPS signal from a second satellite of said plurality of in-view GPS satellites if none of said outputs exceeds said noise threshold level; and
  perform said plurality of fast convolution operations on a corresponding plurality of blocks within said portion of data and for said first Doppler frequency offset.

31. The GPS receiver apparatus of claim 28 further comprising a communication antenna and a communication receiver coupled to said communication antenna and to said DSP, said communication receiver operable to receive a data signal containing satellite data information over a communication link.

32. The GPS receiver apparatus of claim 31 wherein said position information is transmitted to a basestation over said communication link.

33. A method of determining pseudoranges in a global positioning system (GPS) receiver, said method comprising the steps of:
  receiving a plurality of GPS signals from a plurality of in-view GPS satellites;
  storing said plurality of GPS signals in a memory;
  selecting for processing a first satellite from said plurality of in-view satellites based on a position of said first satellite relative to other satellites of said plurality of in-view GPS satellites, said GPS signal comprising pseudorandom sequences;
  selecting a first integration time period that determines a first portion of data in said memory to process;
  selecting a first Doppler frequency offset with which to process said first portion of said data to determine a pseudorange for said first satellite;
  computing a pseudorange for said first satellite by performing a series of fast convolutions on a corresponding plurality of blocks of data within said first portion of data to provide a plurality of corresponding output values of each fast convolution; and
  comparing each output value of said corresponding output values to a pre-defined noise threshold.

34. The method of claim 33 further comprising the steps of:
   determining whether an output value of said corresponding output value exceeds said pre-defined noise threshold; and
   selecting a second integration time period that determines a second portion of data in said memory to process, if no output values of said corresponding output values exceeds said pre-defined threshold value.

35. The method of claim 34 wherein said second integration time period is longer than said first integration time period.

36. The method of claim 35 further comprising the steps of:
   determining whether said second integration time period exceeds a pre-defined maximum time period; and
   computing a pseudorange for said first satellite by performing a series of fast convolutions on a corresponding plurality of blocks of data within said second portion of data to provide a plurality of corresponding output values of each fast convolution, if said second integration time period does not exceed said pre-defined maximum time period.

37. The method of claim 33 further comprising the steps of:
   determining whether an output value of said corresponding output values exceeds said pre-defined noise threshold; and
   selecting a second Doppler frequency offset with which to process said first portion of said data to determine a pseudorange for said first satellite, if at least one output value of said corresponding output values exceeds said pre-defined threshold value.

38. The method of claim 36 wherein said first satellite is positioned more directly above said GPS receiver than said other satellites of said plurality of in-view satellites.

39. The method of claim 38 wherein said step of performing said plurality of fast convolutions on said corresponding blocks of data within said first portion of data is performed using Fast Fourier Transform processes.

40. The method of claim 36 wherein said step of performing said plurality of fast convolutions on said corresponding blocks of data within said second portion of data is performed using Fast Fourier Transform processes.

41. A method of determining pseudoranges in a global positioning system (GPS) receiver, said method comprising:
   receiving a plurality of signals from a plurality of in-view GPS satellites;
   selecting a first satellite for processing a first signal from said plurality of in-view satellites;
   selecting a first integration time period;
   selecting a set of Doppler frequency offsets;
   processing said first signal over said first integration time period and said set of Doppler frequency offsets to produce a first set of outputs;
   comparing said first set of outputs with a first detection threshold in order to form a first set of detected outputs, corresponding to any of said first set of outputs that exceed said first detection threshold;
   associating time indices of said first set of detected outputs with a pseudorange of said first signal and associating amplitudes of said first set of detected outputs with a signal strength of said first signal;
   selecting a second integration time period, which is longer than the first integration time period, if said first set of detected outputs contains no members;
   processing said first signal over said second integration time period and said set of Doppler frequency offsets to a produce a second set of outputs;
   comparing said second set of outputs with a second detection threshold in order to form a second set of detected outputs, corresponding to any of said second set of outputs that exceed said second detection threshold;
   associating time indices of said second set of detected outputs with a pseudorange of said first signal and associating amplitudes of said second set of detected outputs with the signal strength of said first signal.

42. A method as in claim 41 wherein said processing of said first signal over said first integration time period further comprise storing said plurality of signals in a digital memory to produce stored data.

43. A method of determining pseudoranges in a global positioning system (GPS) receiver said method comprising:
   receiving a plurality of signals from a plurality of in-view GPS satellites;
   selecting a first integration time period,
   selecting a set of at least two in view GPS satellites for processing at least two signals from said plurality of in-view satellites,
   for each GPS satellite in said set of at least two in view GPS satellites, performing a first method comprising:
     selecting a first set of Doppler frequency offsets;
     processing a signal, corresponding to each satellite in said set of at least two in view GPS satellites, over said first integration time and said first set of Doppler frequency offsets to a produce a first set of outputs;
     comparing said first set of outputs with a first detection threshold, in order to form a first set of detected outputs, corresponding to any of said first set of outputs that exceed said first detection threshold;
     associating time indices of said first set of detected outputs with a pseudorange of said signal and associating amplitudes of said first set of detected outputs with a signal strength of said first signal,
   selecting a second integration time period, which is longer than the first integration time period,
   for each GPS satellite in said set of at least two in view GPS satellites, for which said first set of detected outputs contained no members, performing a second method comprising:
     selecting a second set of Doppler frequency offsets;
     processing a signal corresponding to each satellite in said set of at least two in view GPS satellites for which said first set of detected outputs contained no members, over said second integration time and said second set of Doppler frequency offsets to a produce a second set of outputs;
     comparing said second set of outputs with a second detection threshold in order to form a second set of detected outputs, corresponding to any of said second set of outputs that exceed said second detection threshold
     associating time indices of said second set of detected outputs with a pseudorange of said signal and associating amplitudes of said second set of detected outputs with a signal strength of said signal.

44. A method as in claim 43 wherein said processing of said signal in said first method further comprises storing said plurality of signals in a digital memory to produce stored data.

* * * * *